Oct. 13, 1970    O. H. ZINKE    3,534,253
MAGNETIC WHEATSTONE BRIDGE MEANS AND MEANS FOR ADJUSTING THE
REAL AND IMAGINARY RELUCTANCE COMPONENTS
OF SAID BRIDGE LEGS
Filed June 27, 1966                                    2 Sheets-Sheet 1

INVENTOR:
OTTO H. ZINKE
BY Charles B. Haverstick
ATTORNEY.

Oct. 13, 1970                    O. H. ZINKE                    3,534,253
        MAGNETIC WHEATSTONE BRIDGE MEANS AND MEANS FOR ADJUSTING THE
             REAL AND IMAGINARY RELUCTANCE COMPONENTS
                          OF SAID BRIDGE LEGS
Filed June 27, 1966                                         2 Sheets-Sheet 2

INVENTOR:
OTTO H. ZINKE
BY Charles B. Haverstock
ATTORNEY.

United States Patent Office 3,534,253
Patented Oct. 13, 1970

3,534,253
MAGNETIC WHEATSTONE BRIDGE MEANS AND MEANS FOR ADJUSTING THE REAL AND IMAGINARY RELUCTANCE COMPONENTS OF SAID BRIDGE LEGS
Otto H. Zinke, 817 N. Jackson Drive, Fayetteville, Ark. 72701
Continuation-in-part of application Ser. No. 301,133, Aug. 9, 1963. This application June 27, 1966, Ser. No. 560,727
Int. Cl. G01r 33/00
U.S. Cl. 324—34
10 Claims

ABSTRACT OF THE DISCLOSURE

Sensitive magnetic bridge means including a magnetic bridge circuit having similar parallel magnetic paths connected across a source of varying magnetic flux, said magnetic bridge circuit also having a magnetic flux between intermediate locations of the parallel paths, means coupled to the intermediate bridge path for detecting changes in the reluctance of the bridge, and means for nulling the bridge both as to the real and imaginary components of the reluctance therein.

---

The present application is a continuation-in-part of copending application Ser. No. 301,133, filed Aug. 9, 1963 by the same inventor.

The present invention relates generally to magnetic test means which are useful in the areas of detection, measurement, and control. More particularly, the invention relates to a novel magnetic circuit capable of detecting energy changes through the simultaneous detection of changes in the magnitude and phase of an induced magnetic flux generated in a magnetic bridge.

There is a wide increasing demand for accurate reliable means for measuring parameters and conditions and changes therein, such as means for measuring temperature, pressure, rate of fluid flow, radiation flux, strain, thickness, as well as the electrical and magnetic properties of substances. There is also need for more accurate and precise control means and for means for comparing selected characteristics of specimen substances with standard substances. There are many devices in existance for performing the various purposes and tasks mentioned above but the known devices, for the most part, are relatively insensitive, inaccurate and unreliable and are also relatively expensive, complicated and difficult to use. The present invention overcomes these and other disadvantages and shortcomings of the known devices. Furthermore, the subject device teaches the consruction and operation of a magnetic circuit capable of responding to and measuring the real, as well as the imaginary components of magnetic reluctance. For these and other reasons, the present invention represents a substantial advancement in the state of the art as relates to devices for detecting, controlling and measuring. The subject invention also represents an advance in the art of balancing and nulling magnetic bridge circuits.

In the past, devices used for the same and similar purposes as the subject device, for the most part, have included electrical circuits in which the materials to be tested or the parameter to be measured formed a current carrying part of the circuit itself. A metallic specimen, whose resistance was to be measured or evaluated, for example, was connected into the electrical circuit in such a way that changes in the resistance and other properties of the specimen reflected in the electrical properties of the circuit itself thereby providing only an approximate measure of the condition being tested or measured. Furthermore, the temperature, composition, geometry and so on of the specimen also effected the results. Electric circuits are also influenced by coupling losses produced in those portions of the circuit which connect the specimen into the circuit and they introduce other factors which complicate the results and make the results relatively unreliable and unsatisfactory for many purposes. Furthermore, if a specimen which has an electrical energy dissipation which is inherently low in relation to that of the coupling connections including the leads which connect the specimen into the circuit, the circuit contacts and switches, the inductive coupling, and so on, the information which is sought about the specimen may become lost with the result that the sensitivity obtained by the electrical means is relatively poor. To overcome these and other undesirable conditions using electrical circuits it is often necesary to substantially increase amounts of energy used and use relatively costly apparatus in an effort to increase the magnitude of the desired signal in relation to the unwanted data. This has greatly reduced the sensitivity and reliability of known devices used for the same purposes as the present device and has limited their usefulness.

It is therefore a principal object of the present invention to provide more accurate means for measuring and detecting the characteristics and properties of substances.

Another object is to reduce or eliminate coupling losses when measuring the properties and characteristics if substances.

Another object is to provide relatively inexpensive magnetic circuit means for measuring, testing, and controlling purposes.

Another object is to provide a magnetic bridge circuit capable of taking into account the real and imaginary components of reluctance.

Another object is to provide passive means for nulling a magnetic bridge circuit.

Another object is to provide relatively inexpensive, yet very sensitive and reliable means for measuring the characteristics of substances.

Another object is to provide a magnetic bridge circuit capable of simultaneously comparing the magnitudes and phases of flux components.

Another object is to provide extremely sensitive means for detecting energy changes and changes in permeability in a magnetic flux circuit.

The present invention comprises a magnetic bridge circuit including pairs of opposed legs and pairs of opposed corners therebetween, means connected between a first pair of the opposed bridge corners including means for generating a varying magnetic field in the bridge circuit, output means including flux responsive means connected between the other pair of said opposed bridge corners to respond to the magnetic flux produced therebetween, passive circuit means coupled to preselected ones of said opposed bridge legs including means for adjusting the impedance characteristics of said passive circuit means to produce a magnetic null condition of the bridge, which condition is indicated by a minimum output responsive in said output means, and means associated with at least one of said bridge legs for producing an energy change therein, which change produces an increase response in the output means.

These and other objects and advantages of the present invention will become apparent after considering the following detailed specification which covers a preferred embodiment of the subject device in conjunction with the accompanying drawings, wherein.

Figure 1:
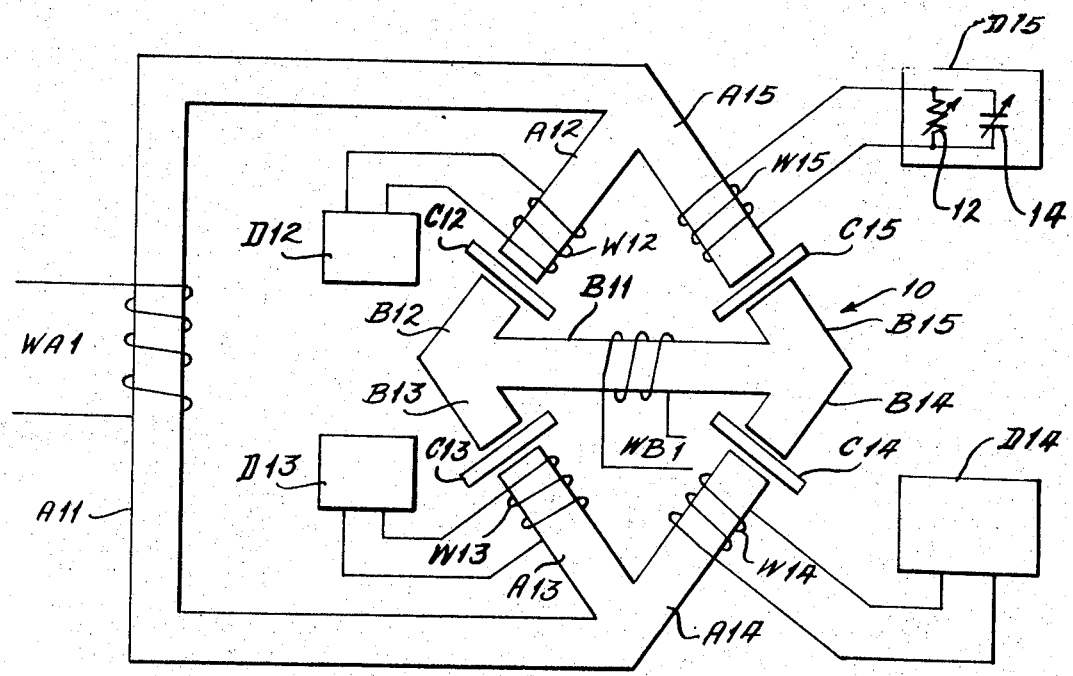
FIG. 1 is a schematic diagram of a magnetic bridge and associated circuit constructed according to the present invention.

Referring to the drawings more particularly by reference numbers, the number 10 refers to a magnetic bridge circuit constructed according to the present invention. The circuit 10 may be in the form of a magnetic Wheatstone bridge circuit constructed to simultaneously respond to changes in the phase and magnitude of the flux generated therein. Other forms of magnetic bridges and bridge circuits can also be used, and it is not intended to limit the present invention to a Wheatstone bridge although a Wheatstone bridge construction has certain advantages in construction and operation. In the past, Wheatstone bridges have been used mostly in electrical as distingushed from magnetic circuits, and so far as known, it has not heretofore been contemplated to construct a magnetic bridge which is capable of responding to both the phase and magnetude characteristics of magnetic flux, which characteristics can be expressed in terms of the real and imaginary components of the circuit reluctance.

Energy losses in magnetic or flux circuits can result from various reasons such as through flux radiation, eddy current losses, absorption of energy by magnetic dipoles or higher order poles in the solid with subsequent transfer of this energy to the lattice of the solid through directly or indirectly coupled components of electrical circuits as by electrically connecting such circuits to coils employed in the flux circuit, and losses can also occur by inserting material into air gaps formed in the flux circuit and so on. All of these and other ways of producing energy losses in a magnetic circuit result in the flux having real and imaginary components of reluctance. The real components of the flux reluctance are affected by the permeability of the material in the flux circuit itself as well as energy storage in capacitors or indicators of coupled circuits and the imaginary components of the reluctance are affected by the energy losses from the flux circuit. In a series flux circuit, the reluctance can therefore be considered as having a real component that arises from the permeability of the magnetic circuit or other energy storage devices and an imaginary component that arises from the energy losses.

By properly constructing a magnetic circuit it is possible to achieve a substantial reduction in the coupling losses as compared with the corresponding losses which occur in an analogous electrical circuit. For example, when measuring the resistance of metals using electrical circuits the coupling losses in a typical case may run as high as the losses in the sample itself. In one such case, the coupling losses were 5 milliwatts compared with a sample loss of approximately 6.5 milliwatts. With a ferrite flux rircuit such as disclosed in this specification, on the other hand, the coupling losses are reduced very substantially so that in a similar test case the coupling losses were approximately 8 microwatts as compared with a sample loss of about 5 milliwatts. Consequently, when using the subject magnetic circuit, the parameters of samples can be measured with much more accuracy because the coupling losses are relatively negligible. In fact, with the present device resistance changes in a metal sample of the order of approximately one ten-millionth of an ohm per unit ohm have been measured using the method of simultaneous comparison of flux magnitude and flux phase. This has not been possible heretofore using electrical bridges and other known devices. Likewise, other minute changes such as minute temperature changes in metals of an order of a 50 one-millionths of a degree Kelvin are detectable with the subject device. This is done by exposing the sample to thermo-radiation with the exposed sample eddy-current coupled to a flux circuit which is constructed to simultaneously respond to changes in the magnitude and in the phase of the flux.

For purposes of this specification, a flux circuit is one in which there is magnetic flux. For example, the leg or legs of a magnetic Wheatstone type bridge might be considered as a flux circuit. The term coupling used in the specification refers to any method of changing the phase and/or magnitude of the flux in a flux circuit by means which absorb energy from the flux circuit. The energy in the flux circuit when the flux is changing may be dissipated or stored by the element or elements being tested by having the element being tested absorb energy from the magnetic circuit. It is also possible to change the magnetic energy in the flux circuit by introducing energy into the flux circuit instead of absorbing energy, although it is usually more desirable and convenient to absorb energy than inject energy for stability reasons. In a DC flux circuit such coupling and energy absorption cannot exist.

An element to be tested using the subject device can be any material in which energy dissipation or energy storage can take place. This includes pieces of magnetic and non-magnetic metal, electrical circuits containing elements in the form of resistors, capacitors, inductors or some combination thereof, as well as other known circuits and circuit elements. It is also contemplated to produce coupling by placing an element or elements in the flux field of the subject circuit in such a manner that the flux passes through the material, as for example, placing the material to be tested in a gap in the flux path so that eddy current are induced therein. This latter method of coupling is called gap-coupling. It is to be understood, however, that the material to be tested need not be placed directly in a gap in the flux circuit to influence the flux in the circuit but may instead be placed adjacent to the flux path and so on. Coupling will also occur where a conductor or coil is placed around a portion of the flux circuit as by placing a coil on one leg of a core structure. This method of coupling is referred to as coil coupling. For this form of coupling the conductors need not actually be in the form of a coil but may be a conductor which forms a closed loop around the flux path.

A substance or condition to be measured is gap-coupled or coil-coupled into the flux circuit in order to produce a change in the condition of the flux. This change is reflected as a change in the energy absorption or dissipation and can be brought about by a temperature change in a specimen, a pressure change, a resistance change, an inductance or capacitive change, and so on. The measurements are usually made after the magnetic circuit has been nulled. In the present magnetic bridge nulling is preferably obtained by adjustable passive means as will be described. The present means can also be used to compare elements to one another such as comparing a test specimen to a standard specimen. In this case the standard element can be gap-coupled into one leg of the present circuit and the specimen to be compared thereto can be gap-coupled into another leg. The same can also be done using coil-coupled elements, and it is also possible in certain cases to compare a gap-coupled element to a coil-coupled element.

Referring to FIG. 1, the magnetic bridge circuit 10 is shown as including integral leg portions A11, A12, A13, A14, and A15. The bridge also includes integrally connected leg portions B11, B12, B13, B14, and B15. The leg portion A11 is the input leg of the bridge and has an input winding WA1 mounted thereon. The winding WA1 is connected to a changing or varying current source which generates a varying flux in the core structure. In similar manner, leg portion B11 is the output leg portion and it has an output winding WB1 mounted on it. The output winding WB1 responds to changes in the condition of the flux in the bridge and is connected to an amplifier or other similar means which in turn energize a reading device such as a galvanometer which provides a visual indication of the output. The output can also be connected to some form of control means depending upon the purposes for which the subject device is being used.

Figure 3:
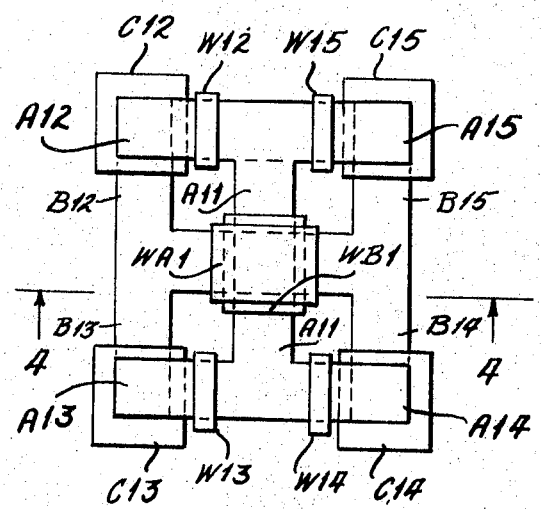
FIG. 3 is a top plan view of the bridge shown in FIG. 2.
Figure 4:
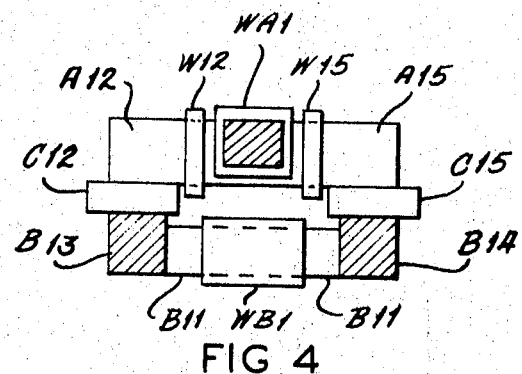
FIG. 4 is a cross-sectional view of the device in FIG. 3 taken along the line 4—4 therein.
Figure 2:
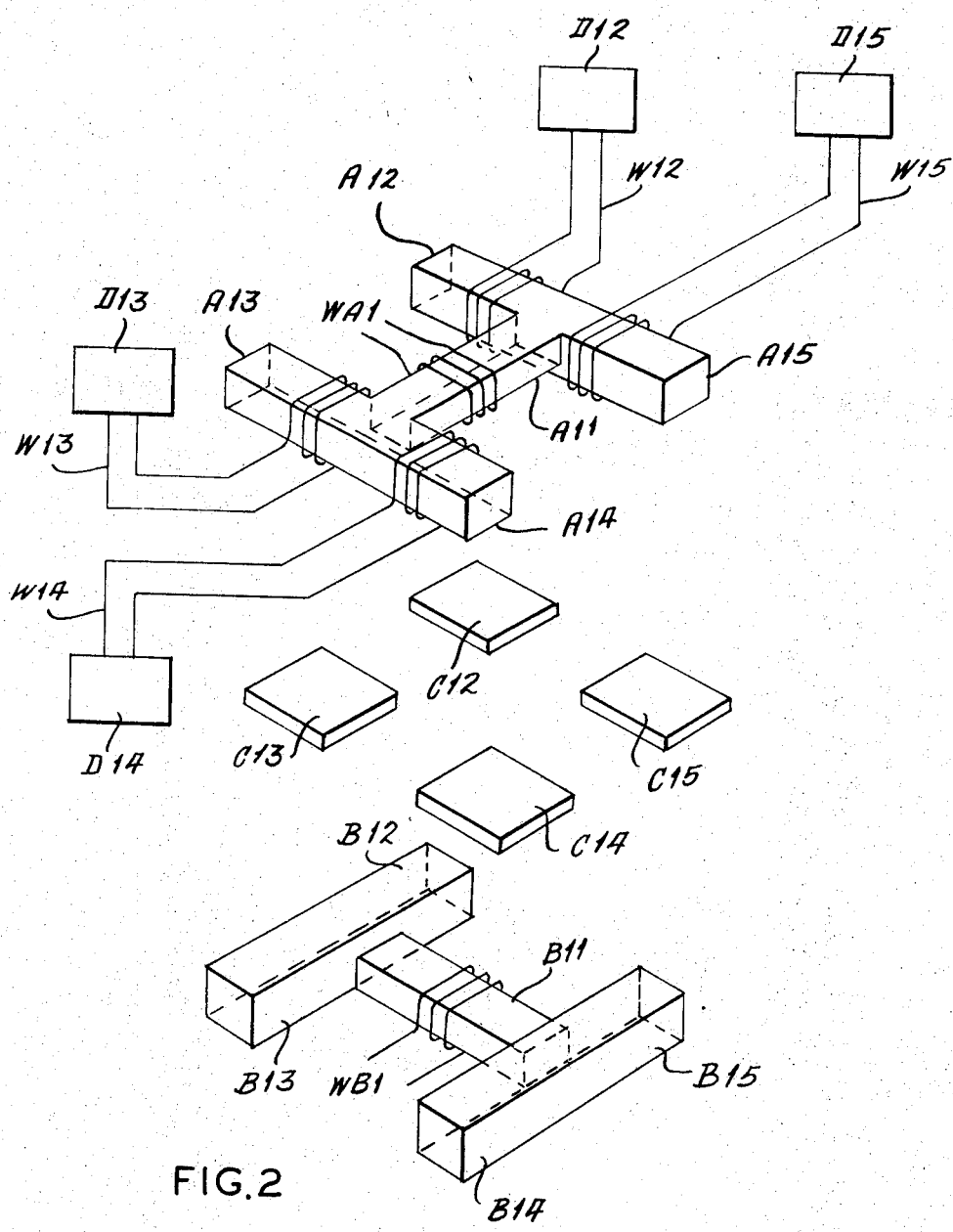
FIG. 2 is an exploded perspective view illustrating a typical embodiment of a flux responsive bridge contructed according to the present invention.

FIG. 2 shows in exploded form a typical magnetic bridge construction formed by two similar H-shaped members which are assembled as shown in FIGS. 3 and 4. In the particular construction shown, the elements C12, C13, C14, and C15 are gap-coupled between the adjacent ends of the legs of the two H-shaped members. It is contemplated that in some cases the leg ends will be in direct contact or even integral as when the device is constructed to employ coil-coupling both for the test sample and for the nulling means. Other configurations for the core structure are also possible and it is not intended to limit the invention to any particular core construction such as that disclosed in the drawings.

Referring again to FIG. 1 it can be seen that each of the leg portions A12, A13, A14, and A15 has a respective winding or coil W12, W13, W14 and W15 mounted thereon. These windings are connected, respectively, to passive circuits such as the circuits D12, D13, D14 and D15. Each of the passive circuits includes adjustable passive elements which are used for nulling the circuit in order to produce a minimum output on the winding WB1 when the bridge is in balanced or null condition. A typical passive circuit is shown in the block D15 and includes a variable resistor 12 and a variable capacitor 14 connected in parallel. Other combinations of passive circuit elements can also be used in these blocks and it is usually desirable to include both resistive and reactive elements. By adjusting the elements in the circuits D12–D15 a null condition is produced, as aforesaid, when the output on the winding WB1 is a minimum. The null condition is produced by the effect the passive circuits have on the real and imaginary components of the flux in the respective legs of the bridge circuit. This simultaneously changes the phase and magnitude of the flux in the legs and hence also produces the desired minimum flux condition in the center or output core leg B11, and in the output coil WB1. It is to be remembered in this connection that the input to the bridge circuit is produced by an alternating current source, not a DC source, a condition which is required in order to make the device operate. If a DC input source were used instead of an AC input source it would only be possible to balance the real reluctance components of the flux. However, by employing an AC input source the reluctance becomes complex and the conditions and equations for balancing the bridge must take into account the fact that the reluctance is complex and that the reluctance has both real and imaginary components. The complex reluctance of the bridge arm A12 can be expressed by the equation:

$$Z_{12} = iX_{12} + R_{12}$$

where $X_{12}$ represents the dissipative aspect of the magnetic circuit which includes the leg formed by the leg portions $A_{12}$ and $B_{12}$ and is analogous to the resistance of an electrical circuit. The symbol $i$ represents the square root of minus one ($-1$) and the real component $R_{12}$ represents the energy stored in the magnetic circuit and this is analogous to the reactance in an electrical circuit.

In the particular structure shown in FIG. 1 the coil-coupled passive circuits are used to null the Wheatstone bridge, and the gap-coupled elements which are positioned between the separate leg portions in the various bridge legs are the material or materials to be tested or compared. The gap-coupled elements may be pieces of metal or foil positioned between the several leg portions and the resistance of one or more of these pieces may be caused to change by changing its temperature and so on. This in turn produces changes in the eddy currents flowing in the elements and produces losses which effect the flux in the associated legs. This also unbalances the bridge and produces changes in the outputs of winding BW1. As mentioned above, the gap-coupled devices need not necessarily be positioned in gaps of the flux circuit, and it is not even necessary to have gaps in the core structure. The structure as shown in the drawings can be further modified by using gap-coupled elements to control and null the magnetic bridge and the means being tested can be either coil or gap-coupled as desired. A thermistor may also be connected in series with one or more of the coil coupled elements or circuits. In other words, the subject device can be constructed to include only coil coupled elements, only gap-coupled elements, or a combination of coil and gap-coupled elements as shown in FIG. 1.

In the structure shown in FIGS. 2–4, the two H-shaped pieces are constructed of a material such as ferrite because ferrite has desirable flux concentrating and magnetic characteristics. Other flux concentrating materials particularly those having relatively low histeresis loss characteristics can also be used and their characteristics to some extent will determine the sensitivity that can be obtained. The use of H-shaped members for the core structure has certain advantages and economies as far as structure is concerned although other shaped members such as X-shaped members and C-shaped members can also be used. Also, in the structure shown in FIGS. 2–4 the elements C13 and C14 may be of suitable dielectric material such as plastic which has no apparent effect on the flux circuit but merely serve as spacers between the two H-shaped pieces. The elements C12 and C15 are then selected of materials to be tested. One of these members may be a piece of untreated material such as aluminum foil and the other member may be of the same material but coated with a blackened material in order to absorb radiation when exposed thereto. If the members C12 and C15 are to be subjected to radiation they should have at least a portion thereof that extends outwardly from the core structure that can be exposed to light or some other source of radiation. When exposed to radiation, the blackened member will absorb more energy than the non-blackened member and hence its temperature will rise faster and further thereby changing the resistance of its foil and causing an unbalanced bridge condition which is indicated by an increase in the output of the coil WB1. In this way, the device is used to sense heat radiation.

The subject device can also be used as a transducer by nulling it in the way described above, and then moving one of the test pieces such as the piece C12 relative to the core so as to cause a signal to be produced in the output. The output signal will increase as the movement of the element C12 increases.

Another possible use for the subject device is as a thermometer or temperature reading device. For this purpose a construction similar to that shown in the drawings may be used. In this case, different materials may be used for the members C12 and C15. For example, the member C12 may include a piece of Nichrome and the member C15 can be a piece of aluminum foil or the like which pieces have a combined effect on the real and imaginary flux components. The bridge is then nulled with these members and thereafter is positioned in ambient temperature environment to be measured. As the temperature changes it will be indicated as differences in the coefficients of resistance of the members C12 and C15 and thus will unbalance the bridge in a way that can be used to record the ambient temperature.

The subject device can also be used in slug rejector mechanisms on coin operated machines by sensing differences in the characteristics of the deposited coins. In this case, the elements C12 and C15 are selected to be genuine copper-silver coins, and it may not be necessary to use any coil coupled elements. The bridge is nulled by using additional gap-coupled elements of ferrite and aluminum material which elements are together brought near to at least one of the gaps in the core structure to produce the nulling condition. Thereafter, when the coin in the position of the element C12 is removed and another coin is moved into its place an output signal will be produced if the substituted coin has a different composition than a genuine coin. When used as a slug rejector, the output coil WB1 will usually be connected to an amplifier circuit which operates a relay or other control member (not shown) which in turn controls whether to pass or reject a coin.

The subject device also has application as a vacuum gage by placing a test sample such as a sample of aluminum foil in the position of the element C12 without using any element in the position corresponding to the element C15. The bridge is then nulled and thereafter placed in a vacuum system. As the pressure is changed a signal is produced in the output winding WB1, which signal is responsive to the heat conducted from the foil C12 at the different pressures. In this case, the foil will be heated by the eddy currents through which the flux response is produced.

In still another application of the subject device, the device may be made to respond to variations or changes of the frequency of the input energy source. For this application the construction of the device may be similar to that shown in FIG. 1 but modified by eliminating the gap-coupled elements. In such a construction, the core elements which may be H-shaped elements are glued directly together with no gaps between them. The device is then nulled by means of coil coupled elements or circuits in the manner described above, and at a particular frequency of the exciting or input signal across the input winding WA1. In an actual test of this device, changes in the frequency of the input signal by as little as 10% produced changes in the output signal by a factor of as much as ten thousand or more. When operated in this way the subject device can be used as a band-reject filter as well as for other purposes. It is also relatively easy to adjust this circuit to the proper frequency. The above examples of possible uses for the subject device are given for illustrative purposes only and are not intended to be an exhaustive list.

Thus there has been shown and described novel magnetic means including a novel flux activated circuit which fulfills all of the objects and advantages sought therefor. Many changes, modifications, variations, and other uses and applications of the subject device will, however, become apparent to those skilled in the art after considering this specification together with the accompanying drawings. All such changes, modifications, variations, and other uses and applications which do not depart from the spirit and scope of the invention are deemed to be covered by the invention which is limited only by the claims which follow.

What is claimed is:

1. A magnetic Wheatstone bridge circuit for magnetic measurements, said circuit comprising two cores of magnetic material each core having a center section and at least two end sections with a coil wound upon the center section of each, the end sections of one core overlapping and being in closely spaced parallel position with the end sections of the other core, the overlapping ends of the cores forming the four legs of the Wheatstone bridge, an A.C. energizing means connected to the coil on one of said cores to provide flux energization of said magnetic bridge, an output utilization means connected to the coil on the other core which coil forms the output of said magnetic bridge, means coupled to said bridge legs for adjusting the real and imaginary reluctance components of said bridge legs to obtain a null flux condition through the bridge output coil, and means for coupling a condition to be measured to said magnetic bridge, said condition causing an unbalance in the complex permeability of the bridge which is reflected as a change in flux through the output coil of the bridge.

2. The magnetic Wheatstone bridge circuit defined in claim 1 wherein said means coupled to said bridge legs for adjusting the real and imaginary reluctance components to obtain a null condition include a coil coupled to at least one of the bridge legs, and a circuit including resistive and reactive components, at least one of which is adjustable, connected across said coil.

3. The magnetic Wheatstone bridge circuit defined in claim 1 wherein said means coupled to said bridge legs for adjusting the real and imaginary reluctance components to obtain a null condition include a circuit including resistive and capacitive passive circuit elements at least one of which is adjustable.

4. The magnetic Wheatstone bridge circuit defined in claim 1 wherein said means coupled to said bridge legs for adjusting the real and imaginary reluctance components to obtain a null condition include first means coupled to one of said bridge legs including means that have an effect on one of said reluctance components in the bridge, said means being adjustable to produce a first null condition in the bridge circuit as indicated by a minimum response in the output utilization means, and second means coupled to at least one of the bridge legs including means that have an effect primarily only on said other component of the bridge reluctance, said second means being adjustable to produce a second null condition in the bridge as to said other reluctance component as indicated by a further reduction in the response of said output utilization means.

5. The magnetic Wheatstone bridge circuit defined in claim 1 wherein at least one of said bridge legs has a gap therein for receiving a sample substance to be tested.

6. The magnetic Wheatstone bridge circuit defined in claim 1 including test means coupled to at least one bridge leg, said test means including means absorbing energy from the bridge, said energy absorbing means changing the magnitude and phase of the magnetic flux produced in the bridge by the A.C. energizing means.

7. The magnetic Wheatstone bridge circuit defined in claim 1 wherein said means coupled to said bridge legs for adjusting the real and imaginary reluctance components of said bridge legs to obtain a null flux condition include passive circuit means including a coil for coupling said passive circuit means to selected legs of the bridge, said passive circuit means including resistive and reactive elements, at least one of said resistive elements being adjustable principally to produce a null condition in the imaginary components of bridge reluctance as indicated by a first minimum condition in said output utilization means, and at least one of said reactive elements being adjustable principally to produce a null condition of the real components of the bridge reluctance as indicated by a further reduction in the response in the output utilization means, a balanced condition of the bridge occurring when no flux is produced in the center section of the core associated with the output utilization means.

8. The magnetic Wheatstone bridge circuit defined in claim 1 including means coupled to at least one bridge leg to produce a change in the magnitude and phase of the bridge reluctance components.

9. The magnetic Wheatstone bridge circuit defined in claim 1 wherein said means coupled to said bridge legs for adjusting the real and imaginary reluctance components of said bridge legs to obtain a null flux condition include magnetic and conductive elements coupled to at least one of the bridge legs, means for changing the coupling between at least one of said elements and the associated bridge leg to change the reluctance of said leg and to produce a null condition with respect to one of the reluctance components of the bridge, means for changing the couciated bridge leg to produce another change in the reluctpling between another one of said elements and the assoance of said bridge and to produce another null condition with respect to the other bridge reluctance component, a balanced condition of the magnetic bridge being represented by the absence of flux in the central section of the bridge associated with the output utilization means.

10. The magnetic Wheatstone bridge circuit defined in claim 9 include means capable of changing the magnitude and phase of the flux in the bridge.

References Cited

UNITED STATES PATENTS

| | | | |
|---|---|---|---|
| 2,155,267 | 4/1939 | Hathaway | 324—40 |
| 2,321,355 | 6/1943 | Berman | 324—41 |
| 2,440,985 | 5/1948 | Summers | 324—34 |

FOREIGN PATENTS

| | | |
|---|---|---|
| 765,071 | 1/1957 | Great Britain. |
| 226,922 | 9/1958 | Australia. |
| 875,710 | 8/1961 | Great Britain. |
| 1,031,622 | 6/1966 | Great Britain. |

OTHER REFERENCES

Zinke et al.: Magnetic Flux Sensor; The Review of Scientific Instruments; vol. 36, No. 7, pp. 916–920, July 1965.

ALFRED E. SMITH, Primary Examiner

R. J. CORCORAN, Assistant Examiner

U.S. Cl. X.R.

323—75

UNITED STATES PATENT OFFICE
CERTIFICATE OF CORRECTION

Patent No. 3,534,253                                October 13, 1970

Otto H. Zinke

It is certified that error appears in the above identified patent and that said Letters Patent are hereby corrected as shown below:

Column 2, line 60, "responsive" should read -- response --. Column 3, line 43, "indicators" should read -- inductors --. Column 5, line 18, "o" should read -- to --. Column 6, line 24, "histeresis" should read -- hysterisis --; line 67, after "in" and before "ambient" insert -- an --. Column 7, line 37, "exiciting" should read -- exciting --. Column 8, lines 74 and 75, "ciated bridge leg to produce another change in the reluct- pling between another one of said elements and the asso-" should read -- pling between another one of said elements and the associated bridge leg to produce another change in the reluct- --. Column 9, line 15, "2,440,985" should read -- 2,440,984 --.

Signed and sealed this 6th day of April 1971.

(SEAL)
Attest:

EDWARD M. FLETCHER, JR.                      WILLIAM E. SCHUYLER, JR.
Attesting Officer                                  Commissioner of Patents